July 5, 1966  R. EBERHART  3,259,318
COMBINATION MOBILE HOME AND HEATING SYSTEM
Filed Feb. 18, 1963  9 Sheets-Sheet 1

FIG. 1

INVENTOR.
RAY EBERHART
BY *M. A. Hobbs*
ATTORNEY

July 5, 1966 R. EBERHART 3,259,318
COMBINATION MOBILE HOME AND HEATING SYSTEM
Filed Feb. 18, 1963 9 Sheets-Sheet 3

INVENTOR.
RAY EBERHART
BY M. A. Hobbs
ATTORNEY

July 5, 1966 R. EBERHART 3,259,318
COMBINATION MOBILE HOME AND HEATING SYSTEM
Filed Feb. 18, 1963 9 Sheets-Sheet 4

FIG. 5

INVENTOR.
RAY EBERHART
BY M. A. Hobbs
ATTORNEY

INVENTOR.
RAY EBERHART
BY M. A Hobbs
ATTORNEY

July 5, 1966   R. EBERHART   3,259,318
COMBINATION MOBILE HOME AND HEATING SYSTEM
Filed Feb. 18, 1963   9 Sheets-Sheet 6

INVENTOR.
RAY EBERHART
BY M. A. Hobbs
ATTORNEY

July 5, 1966 R. EBERHART 3,259,318
COMBINATION MOBILE HOME AND HEATING SYSTEM
Filed Feb. 18, 1963 9 Sheets-Sheet 7

INVENTOR.
RAY EBERHART
BY M.A. Hobbs
ATTORNEY

July 5, 1966    R. EBERHART    3,259,318
COMBINATION MOBILE HOME AND HEATING SYSTEM
Filed Feb. 18, 1963    9 Sheets-Sheet 8

INVENTOR.
RAY EBERHART
BY Hobbs & Easton
ATTORNEYS

United States Patent Office 3,259,318
Patented July 5, 1966

3,259,318
COMBINATION MOBILE HOME AND
HEATING SYSTEM
Ray Eberhart, 317 E. Jefferson Blvd., Mishawaka, Ind.
Filed Feb. 18, 1963, Ser. No. 259,783
9 Claims. (Cl. 237—31)

This application is a continuation-in-part of my copending application, Serial No. 712,831, filed February 3, 1958, now abandoned. The present invention relates to mobile homes and more particularly to a combination mobile home and heating system.

The primary object of the present invention is to provide an efficient, centralized hot air heating system for mobile homes, which is mounted on the vehicle beneath the floor of the living space and which gives uniform heating automatically throughout the living space.

Another object of the invention is to provide a hot air heating system for heating relatively small structures, which can be placed under the floor in confined areas and yet effectively circulate the heated air through the living space in the structure.

Another object of the invention is to provide a compact horizontally arranged oil or gas consuming space heating unit for mobile homes and the like which is mounted on the structure beneath the floor and which is provided with an efficient air cooled stack adapted to pass upwardly through the structure in a confined area without any danger of overheating adjacent structure members.

Still another object of the invention is to provide a hot air heating unit of the aforesaid type for installation in confined areas which effectively utilizes the heat from the entire furnace body and adjoining stack to heat and circulate the air through the space to be heated.

A further object is to provide an efficient, safe hot air space heating unit which will operate either by forced draft of convection for transferring the heat from the heat exchanger through the space being heated.

Another object of the invention is to provide a heating system for mobile homes which can easily be installed on the vehicle structure beneath the floor and thereafter effectively controlled, and readily inspected, serviced and repaired.

Another object of the invention is to provide a balanced pressure heating system which withdraws air from the space being heated at the floor and near the ceiling and which automatically and instantaneously supplies fresh air as needed to balance pressures in the system.

Additional objects and advantages will become apparent from the following description and accompanying drawings, wherein.

Figure 1:
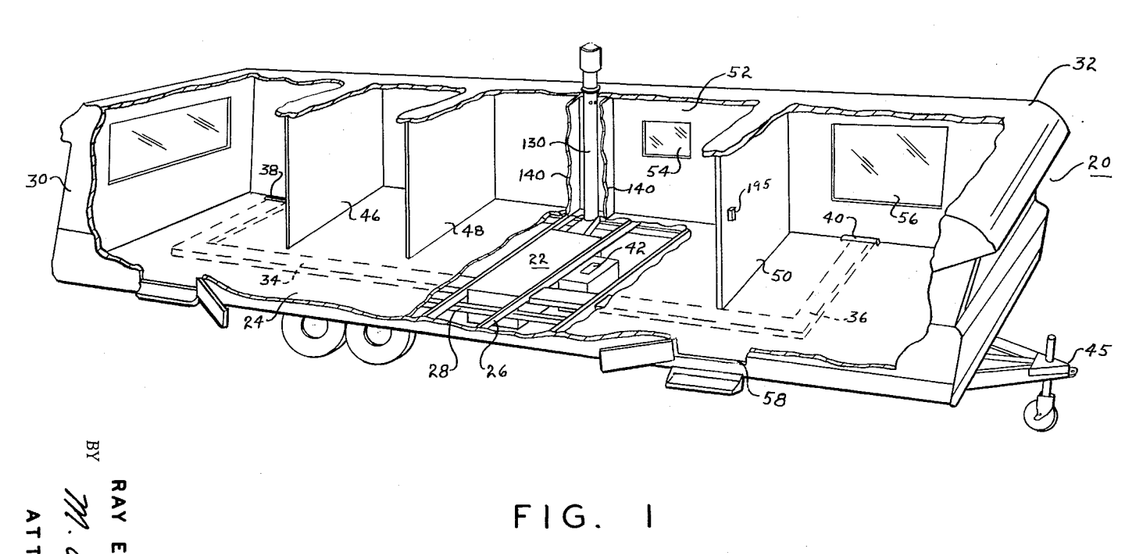
FIGURE 1 is a cutaway perspective of a mobile home showing my heating system installed beneath the floor and the hot air duct connected to outlet registers.
Figure 2:
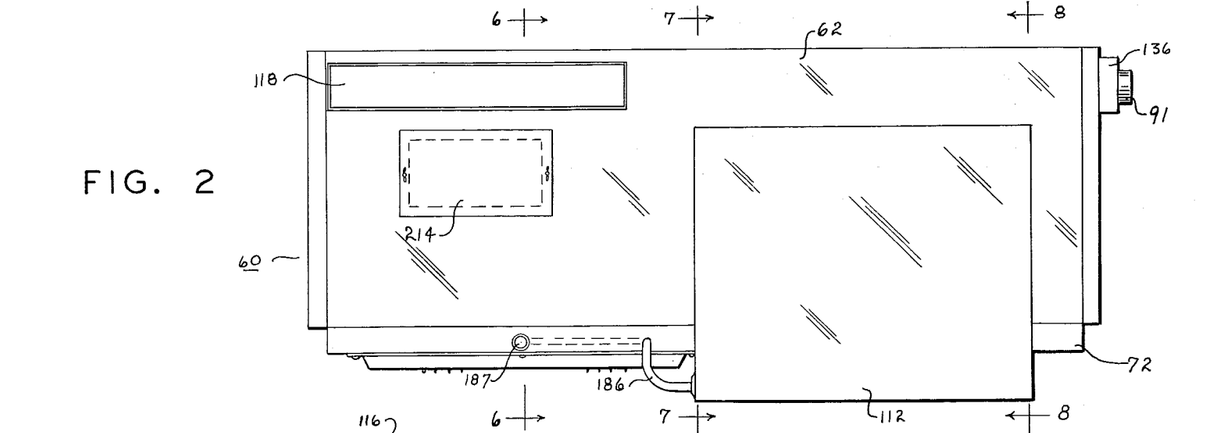
FIGURE 2 is a side elevational view of my heating unit shown removed from the vehicle.
Figure 3:
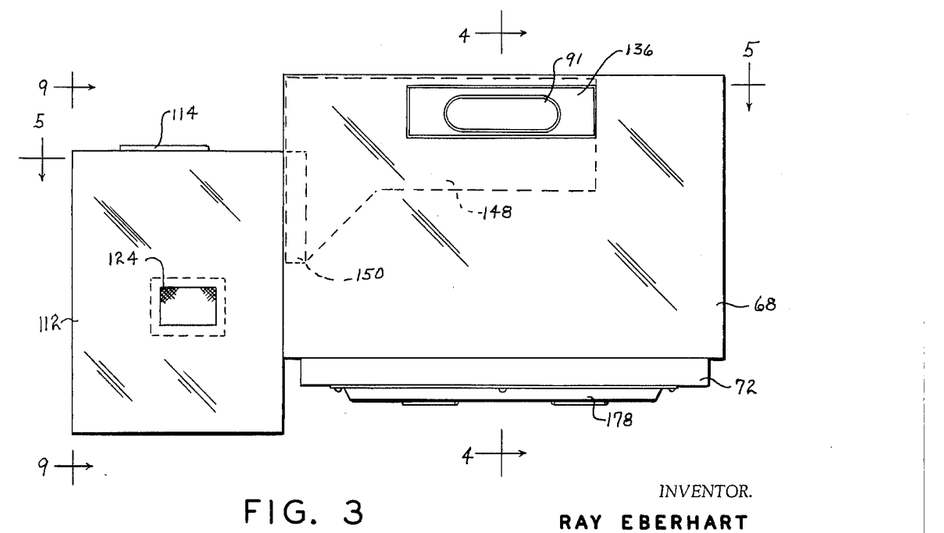
FIGURE 3 is an end elevational view of the heating unit shown removed from the vehicle.
Figure 4:
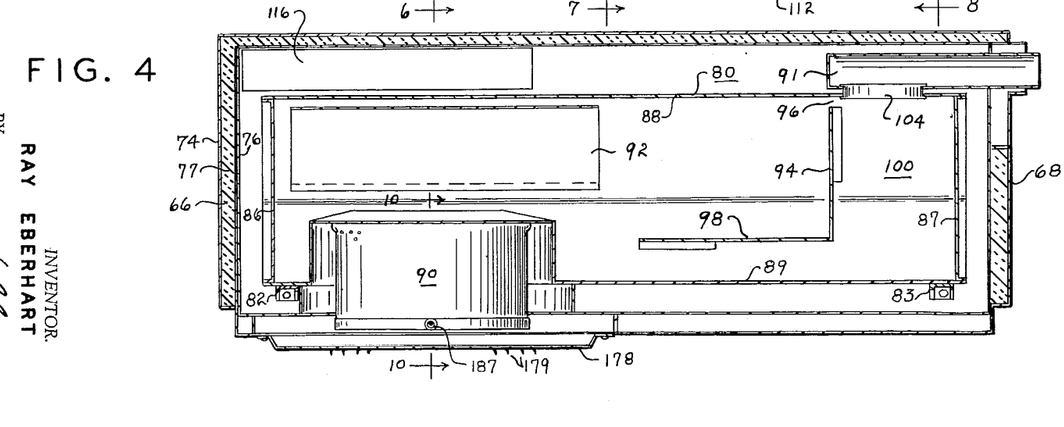
FIGURE 4 is a vertical cross sectional view of the heating unit taken on line 4—4 of FIGURE 3.
Figure 5:
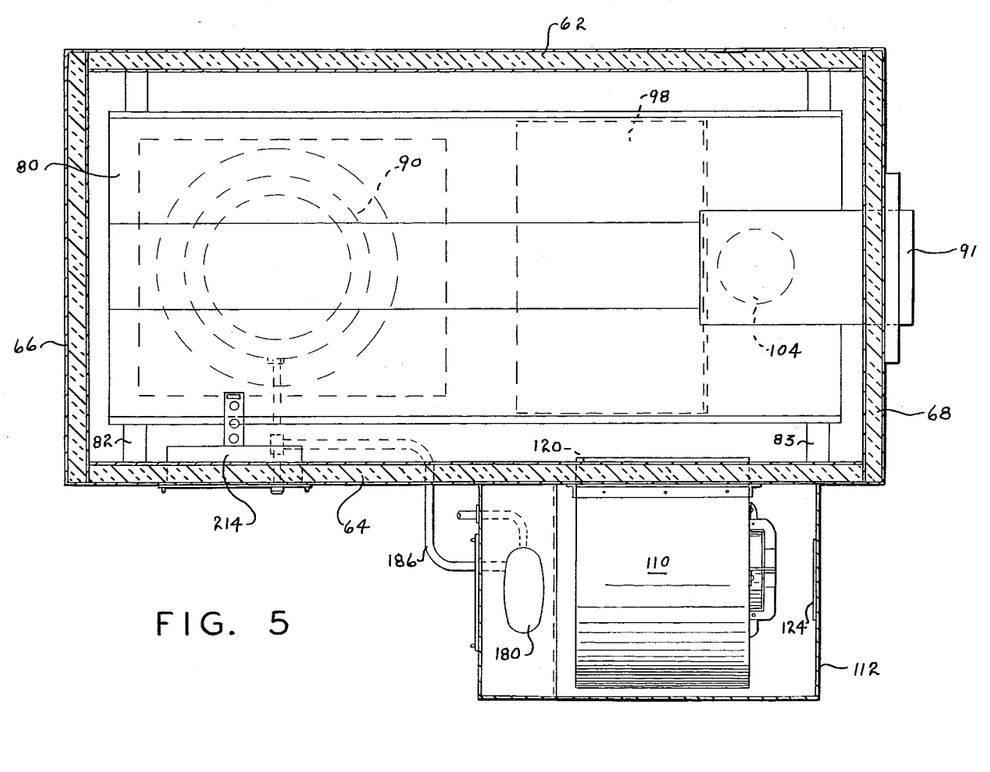
FIGURE 5 is a horizontal cross sectional view of the heating unit taken on line 5—5 of FIGURE 3.
Figure 6:
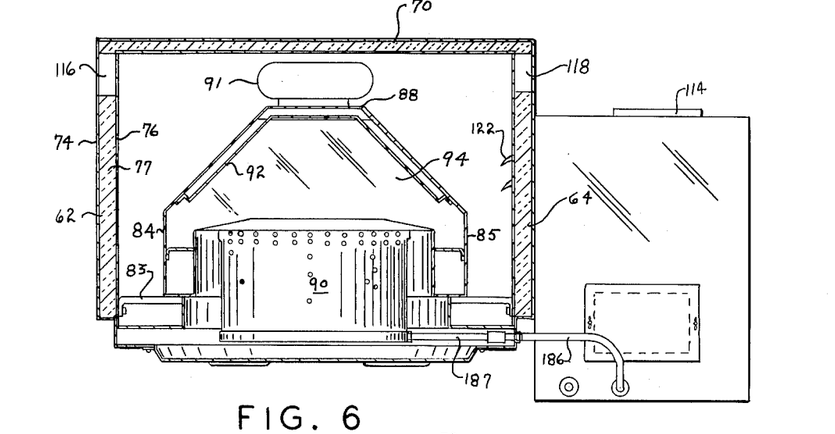
FIGURE 6 is a vertical cross sectional view of the heating unit taken on line 6—6 of FIGURE 2.
Figure 7:
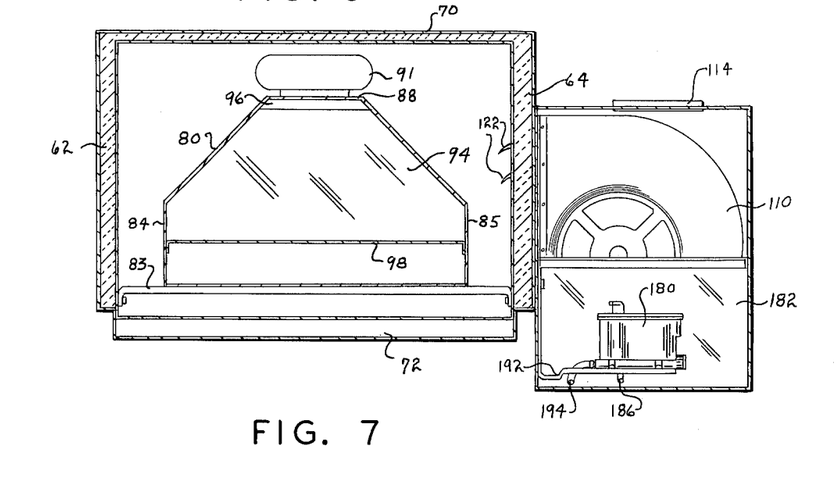
FIGURE 7 is a vertical cross sectional view of the heating unit taken on line 7—7 of FIGURE 2.
Figure 8:
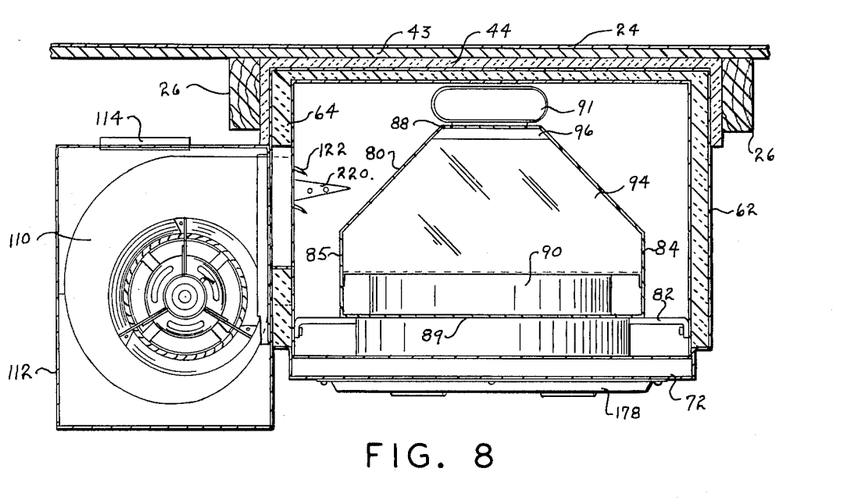
FIGURE 8 is a vertical cross sectional view of the heating unit taken on line 8—8 of FIGURE 2.
Figure 9:
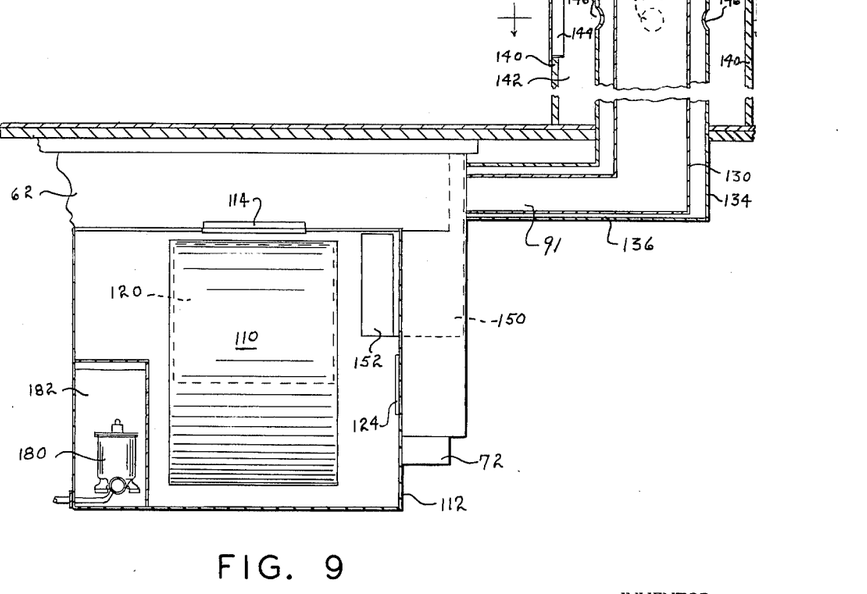
FIGURE 9 is a partial cross sectional and elevational view of my heating unit taken on line 9—9 of FIGURE 3, and a vertical cross sectional view of the exhaust stack forming a part of my heating system.

Referring more specifically to the drawings and to FIGURE 1 in particular, numeral 20 designates a mobile home in which the present heating unit 22 is shown mounted beneath the floor 24 and rigidly secured to the joist 26 and frame members 28 by suitable fixtures (not shown). A portion of floor 24, side 30 and roof 32 have been broken away in the drawing to show the position of the unit in the home and the location of the hot air ducts 34 and 36 and registers 38 and 40. A cold air inlet 42 shown in the top of the heating unit is connected by a duct to one or more cold air registers (not shown) located in floor 24. FIGURE 8 shows the unit mounted in place in greater detail, including the subflooring 43 and insulating material 44 between the top of the unit and the vehicle structure. The mobile home illustrated in FIGURE 1 is mounted on four wheels and is adapted to be connected to a towing vehicle by a coupling 45 at the front of the home. Partitions 46, 48 and 50 form compartments for bedrooms and bath, and side wall 52 is shown with the usual windows 54 and 56 and door 58. While the present heating unit is particularly suitable for use with mobile homes and is so illustrated herein in detail, it is suitable for use as a heating unit in other structures and is especially adapted for use as an underfloor unit where the space is limited and installing and servicing would normally be difficult. For convenience of description, the illustration herein will be directed to its use in connection with a typical mobile home.

The housing 60 of the heating unit is generally rectangular in shape and consists of side panels 62 and 64, end panels 66 and 68, and top and bottom panels 70 and 72, respectively, the top panel being integrally joined to the side and end panels and the end panels being intregally joined to the side panels. The bottom panel is secured to the lower edges of the side and end panels and is adapted to be removed therefrom to facilitate installing, servicing, and repairing of the unit. Each of the panels is constructed of a sheet metal outside wall 74, a sheet metal inside wall 76, and a relatively thick layer of fireproof insulating material 77 such as fibreglass. Mounted inside housing 60 and spaced from the inside walls thereof is a heat exchanger 80 supported on cross members 82 and 83 of channel iron secured at their ends to the side panels of the housing by bolts extending through inside wall 76 of each of the side panels. The heat exchanger is constructed of sheet metal walls 84 and 85, ends 86 and 87 and top and bottom 88 and 89, respectively. The spacing of the heat exchanger from the side, end and top and bottom panels permits the air being heated to surround the heat exchanger on all sides as it passes from the cold air return to the hot air ducts and not only provides good heating efficiency but also gives maximum safety from overheating. The heat exchanger which is relatively long and low and is positioned horizontally in the housing contains an oil burner 90 in the bottom near one end and a flue 91 in the opposite end at the top. A shield 92 following generally the contour of the top of the heat exchanger is secured to and spaced from the inside wall thereof and forms a liner to prevent the burner flame from impinging on the inside wall of the heat exchanger. Interposed between burner 90 and flue 91 is a vertical baffle 94 attached to the sides of the heat exchanger and spaced from the top and bottom, the space 96 at the top of the baffle being insufficient to accommodate all the hot gases from the burner, thus requiring a large portion of those gases to be diverted into the lower part of the heat exchanger beneath the baffle. A second baffle 98 joined to the lower edge of baffle 94 extends horizontally between the vertical baffle and the burner and deflects the hot gases along the bottom of the heat exchanger. With this baffle arrangement the hot gases on leaving burner 90 flow along the underside of the heat exchanger top to baffle 94 where a small portion passes through space 96 to flue 91 and the major portion passes downwardly along baffle 94, horizontally along the upper surface of baffle 98, through the space beneath the latter baffle and thence upwardly in compartment 100 and out through flue 91. It is seen that the gases in passing from the burner to the flue pass in direct contact with the top, sides, bottom and rear of the heat exchanger and as a result give maximum heating efficiency. Flue section 91 connecting a hole 104 in the top of the heat exchange with the stack is substantially oval in cross section and lies horizontally between the upper panel 70 and the top of the heat exchanger. The air flowing through the housing as it passes between the cold air return to the hot air outlet passes freely around section 91.

A blower 110 is mounted at the side of housing 60 in a blower compartment 112 and draws air from the cold air return through opening 114 in the top of compartment 112 and forces it into housing 60 around the heat exchanger and thence through hot air ports 116 and 118 into hot air ducts 34 and 36, respectively. The particular type of blower is not important, the one shown being a conventional wheel type with a built-in electric motor. The cold air is drawn through the opening at the two sides of the blower and is discharged into the housing through opening 120 in panel 64. Deflectors 122 are preferably provided on the discharge side of opening 120 to direct the cold air downwardly around the heat exchanger. In addition to recirculating the air from the space being heated, through the heating unit and back to the space, fresh air from the atmosphere is constantly drawn into the system through a screened port 124 in one end of blower compartment 112.

In order to utilize the heat normally discharged through the stack to permit the stack to be placed in confined areas, a back draft construction is employed wherein air is drawn downwardly along the outside surface of the stack into the blower compartment where it is mixed with the air from the cold air return and from fresh air port 124. This air is further heated by passing it through the housing around the heat exchanger before being discharged through the hot air ducts 34 and 36. The hot stack 130 which is round in cross section is connected at its lower end to flue section 91 and passes upwardly through the floor structure 24 and roof members 132 to the atmosphere. This stack is enclosed in a concentric cold stack 134 which is connected at its lower end with a duct 136 and closed at its upper end by an end member 138 which in the illustration in the drawings is the ceiling of the mobile home. For the purpose of interior decoration of the home, the two stacks are preferably enclosed by walls 140 forming a compartment 142 which is connected near its upper end with the space being heated by a register 144. The space between the hot and cold stacks is connected with compartment 142 by a plurality of holes 146 in the upper end of the cold stack, and is connected with the blower compartment 112 by duct 136 and passages 148 and 150 in end and side panels 68 and 64, respectively, and opening 152. Duct 136 surrounds flue 91 between stack 134 and the inner wall of panel 68 so that the flue and hot stack are completely enclosed from the housing of the heating unit to the ceiling or roof of the mobile home. While the blower is in operation, air is constantly drawn from the room being heated through register 144, holes 146, downwardly through the space between the cold and hot stacks and between duct 136 and flue 91 and thence through passages 148 and 150 and hole 152 into the blower compartment where it is mixed with the air therein and recirculated through the heating unit and room. While the drawings show the space between the cold and hot stacks connected with the room, as a modified form the cold stack may extend through the roof and communicate with the outside atmosphere to provide the fresh air for the system.

Figure 10:
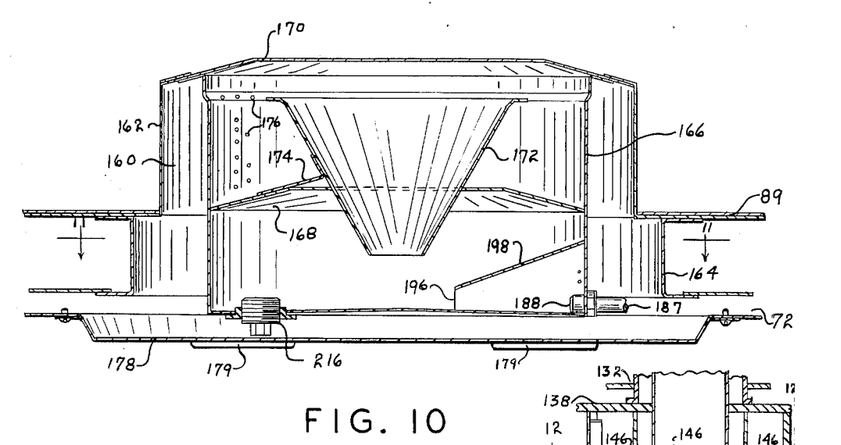
FIGURE 10 is a vertical cross sectional view of my burner employed in the heating unit, taken on line 10—10 of FIGURE 4.

The burner 90 is mounted in the bottom of the housing and heat exchanger within a cylindrical chamber 160 formed by annular wall 162 joined integrally with the bottom of the heat exchanger and annular wall 164 separating chamber 160 from the space around the outside of the heat exchanger. The upper and lower edges of wall 162 are sealed with the top of the burner and the bottom of the heat exchanger, respectively, and wall 164 is sealed to the bottom of the heat exchanger and to panel 72 so that combustion gases from the burner cannot enter the housing around the heat exchanger. The burner consists of a cylindrical pot 166 having a low fire ring 168, a high fire ring 170 and preferably a flame deflecting cone 172 mounted concentrically in the pot and supported by low fire ring 168 by a plurality of brackets 174. Cone 172 increases the efficiency of the burner by facilitating mixing of the air and fuel vapors in the pot. Numerous air holes 176 are provided in the sides of the pot such as illustrated in part of FIGURE 10. The size, shape and distribution of the holes may vary depending upon the conditions under which the heating unit is to be used and upon the specific kind of fuel used. A removable door 178 closes the bottom of the housing beneath the burner and contains a number of slots or louvers 179 for supplying air through the space around the burner to air holes 176 in the sides of the pot.

In a modified form the pot 166 may be placed in a lengthened housing to the left of end plate 86 and connected to the heat exchanger through said end plate by an elbow type structure forming part of the burner. With this type of burner the flame enters the heat exchanger in a horizontal direction instead of vertical and tends to produce a uniform flow of hot gases from the burner through the heat exchanger.

The fuel oil is supplied to the pot from a constant level control device 180, mounted in a compartment 182, through tubes 186 and 187 and inlet orifice 188. For the purpose of the present description, control device 180 may be considered conventional, including a float operated valve and an off-on fuel control valve, and will not be described in detail herein. Brackets 192 secured to the side of compartment 182 support the device at approximately the required height in relation to the pot to place the fuel level in the device one half inch above the bottom of the pot. The fuel is delivered from a supply tank to the device through a tube 194 and a valve in the device controls the flow of fuel to the burner in response to a thermostat 195 located in the space being heated. The valve in the control device turns on the flow of fuel to the burner when heat is required in the space and shuts off the fuel when the temperature in the space has reached the setting on the thermostat. After the valve has shut off the flow of fuel to the burner, sufficient fuel is supplied to the pot to maintain a pilot flame at the outlet 196 of the pilot cone 198.

Figure 11:
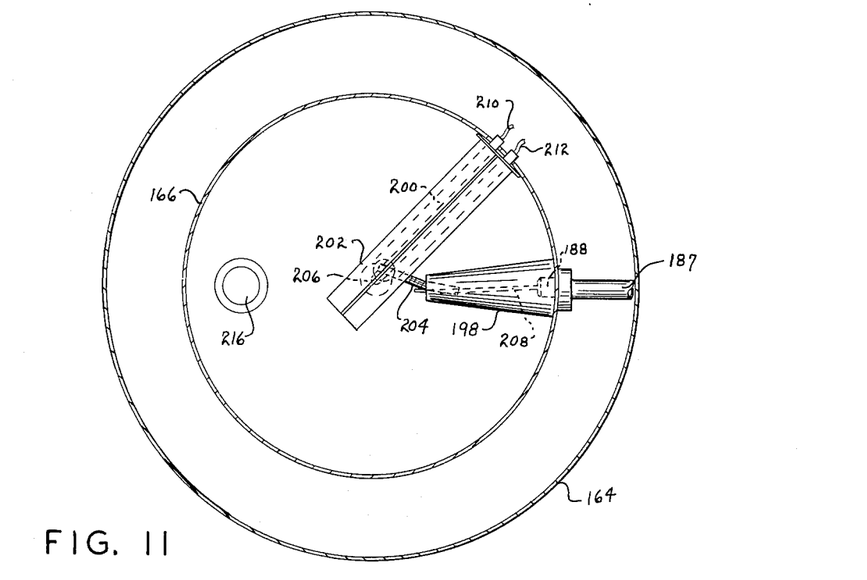
FIGURE 11 is a horizontal cross sectional view of the burner taken on line 11—11 of FIGURE 10.
Figure 12:
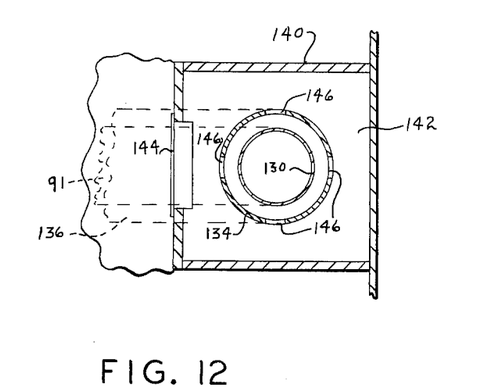
FIGURE 12 is a horizontal cross sectional view of the exhaust stack construction taken on line 12—12 of FIGURE 9.

The mechanism for initially igniting the burner is shown in FIGURE 11 and consists of a calrod heating bar 200 enclosed in a case 202 and connected to pilot cone 198 by a metal web wick 204. The wick extends from the rod through a hole 206 in the bottom of the case and into the end of the pilot cone where it dips into a small channel 208 leading from the fuel inlet orifice 188. The electrical wires 210 and 212 for the ignition bar pass through the side of the pot and are connected to controls in the side of the housing mounted in control box 214. In the event of a power failure the burner may be lighted through an emergency plug 216 in the bottom of the pot.

The operation of the present heating system is regulated by well known conventional and standard controls, including high and low level limit switch 220, blower switch and ignition control. These controls are located in control box 214 in the side of the housing adjacent the burner. The operation of these controls will be briefly mentioned in connection with the description of the operation of the present heating system.

In the operation of the heating system, fuel is supplied to constant level control device 180 from a supply tank located outside of the mobile home and delivered therefrom to the pilot cone in an amount sufficient to maintain a pilot flame. When the electrical system for the heating unit is initially energized, the switch controlling ignition bar 200 is closed so that this bar immediately becomes hot and through the fuel in wick 204 ignites the fuel in pilot cone 198. The bar remains hot until the heat from the burner and heat exchanger is sufficient to cause the heat responsive switch controlling the bar to open. When the thermostat switch in the room being heated closes in response to a decrease in the temperature in the room, the valve in fuel control device 180 opens and admits a relatively large flow of fuel into the bottom of the pot. Since the pot is maintained hot by the pilot flame, the fuel on entering the pot immediately vaporizes and is ignited by the pilot flame. While the burner is in full operation, a large flame is maintained above and in the upper portion of the pot and is sufficient to thoroughly heat the heat exchanger as the hot gases therefrom pass under the top along baffles 94 and 98, thence along the bottom under baffle 98 and through flue 91 to stack 130. When the air in the space between the heat exchanger and the housing reaches a predetermined degree the blower switch closes, starting the blower which draws cold air from the cold air return ducts through opening 114 in the top of the blower compartment 112, and simultaneously draws air from near the ceiling of the room being heated through register 144, holes 146, downwardly through the space between stacks 130 and 134, through duct 136 and passages 148 and 150 into blower compartment 112. The air as it passes downwardly in the space between the two stacks is partially heated by the hot stack which is cooled sufficiently to render it safe for use in limited space. The air from the cold air return and from the cold stack is discharged from the blower into the space between the heat exchanger and the housing where it is heated to the desired temperature and thence forced from the housing through hot air ducts 34 and 36 to registers 38 and 40 in the space being heated.

The present system balances itself and furnishes sufficient fresh air as is necessary to replace the air escaping from the room. As the air leaks from the room either through an open door or window of through ventilators, air is drawn into the system through air port 124 in the side of compartment 112, thus providing fresh heated air for the room without cold drafts. When the room reaches the desired temperature as determined by thermostat 195 the fuel flow to the burner is shut off by the valve in control device 180, with the exception of that necessary to maintain the pilot flame, and as the air in the space around the heat exchanger reaches a predetermined low level the blower shuts off. The heating unit remains in this condition until the room thermostatic switch again closes, restarting the heating cycle.

Figures 13, 14, 15:
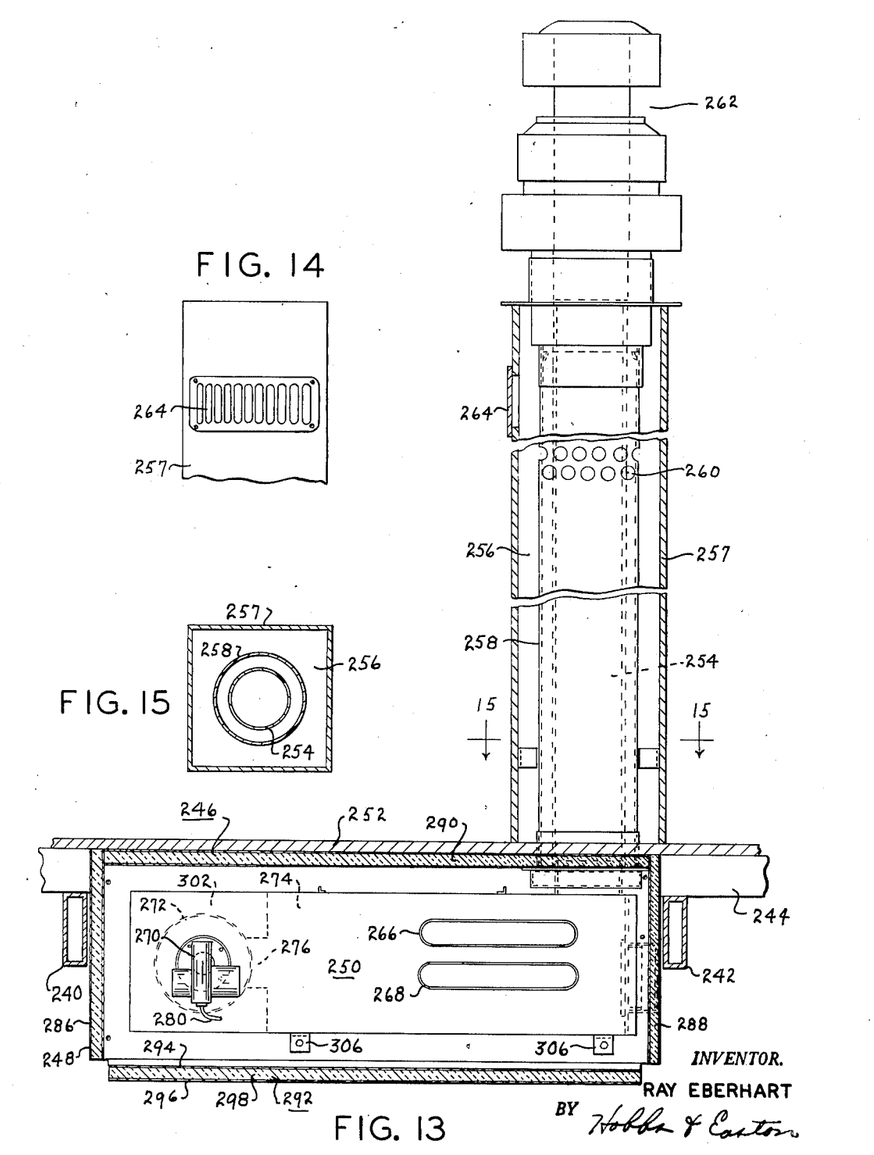
FIGURE 13 is a vertical cross sectional view through the present heating system showing a modified and improved form thereof.
FIGURE 14 is a fragmentary elevational view of an intake vent of the heating system.
FIGURE 15 is a horizontal cross sectional view taken on line 15—15 of FIGURE 13.
Figure 16:
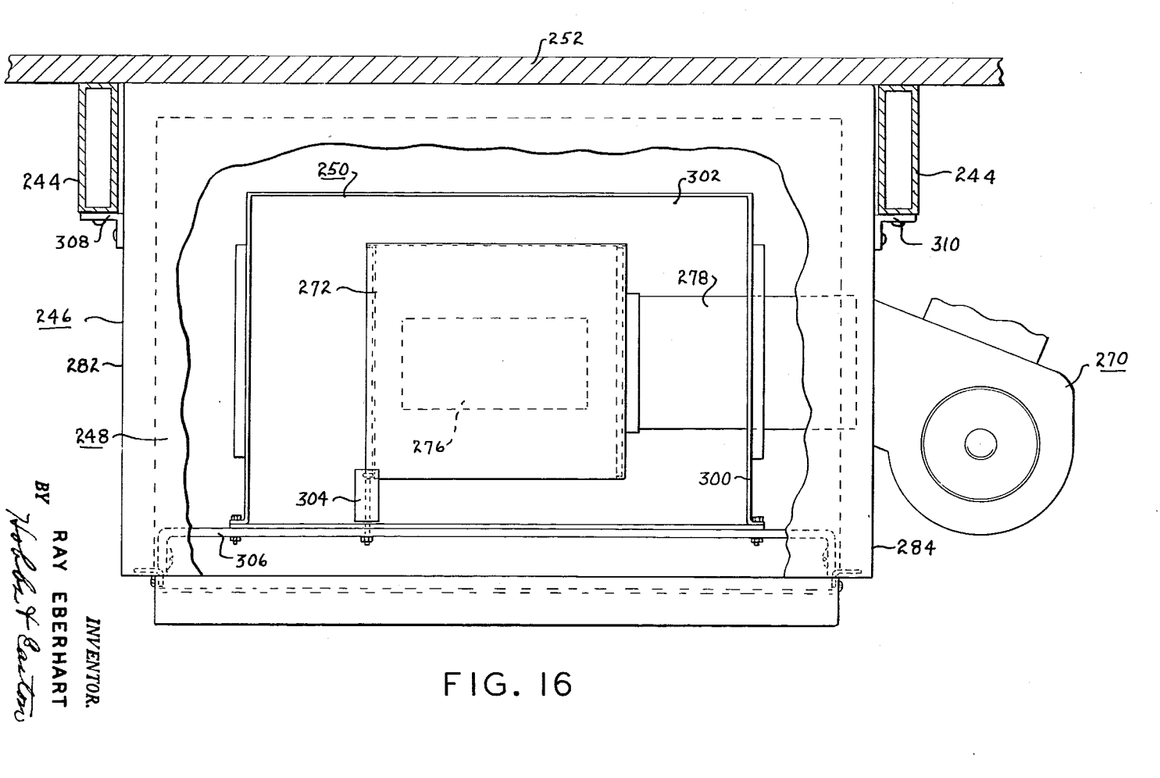
FIGURE 16 is an end elevational view of a portion of the heating system.

In FIGURE 13 a modified form of the present heating system in combination with a mobile home or trailer is illustrated, the trailer members consisting of longitudinal frame members 240 and 242 extending substantially the full length of the mobile home and a plurality of transverse members 244 spaced substantially uniformly on the upper surface of longitudinal members 240 and 242 throughout the full length of the mobile home. This construction is partially shown in FIGURE 1 of the drawings, in which a longitudinal member 28 and cross member 26 are shown. The heating unit, designated by numeral 246 and consisting generally of an insulated shell or housing 248 and a heat exchanger 250, is mounted against the underside of floor 252 of the mobile home and disposed directly between longitudinal members 240 and 242 and between two transverse members 244. The heating unit is supported by brackets, or other suitable securing means, either on the longitudinal members or the transverse members. It is thus seen that the heating unit requires little vertical space in addition to that normally provided for installation of utility equipment and fixtures under the floor of the mobile home. One end of heat exchanger 250 is connected to flue 254 which extends upwardly through a compartment 256 formed by walls 257, preferably located adjacent the outside wall of the mobile home. Completely surrounding and fully enclosing flue 254 is a cold stack 258 which communicates with the space in compartment 256 through a plurality of holes 260 and is connected to blower compartment 112 in the manner previously described herein. The flue discharges the combustion gases through a suitable cap 262 above the roof. A vent 264 connects the compartment surrounding the stack with the living space of the mobile home, preferably near the ceiling.

Since most mobile homes are constructed of inflammable plywood and the like, and the walls such as those forming compartment 256 must be effectively protected from the hot flue, a cold stack is employed which not only completely surrounds and encloses the flue for proper safety, but also effectively and rapidly removes the heated air from the space between the flue and cold stack. The foregoing structure described herein performs these functions efficiently and gives the required protection to the occupants of the mobile home.

The shell or housing 248 is an elongated, rectangularly-shaped structure fitting snugly between the longitudinal and transverse frame members, and preferably projects only a short distance below the lowermost portion of the two longitudinal members. The heat exchanger 250 contained in the shell is similar in construction to the one previously described herein; however, relatively flat and broard cross passages 266 and 268 are used in place of the round, tubular air passages previously illustrated. In this embodiment, a pressure gun-type oil burner 270 is employed in place of the pot-type burner and is mounted on the side of the heat exchanger and extends outwardly through the side of shell 248. A combustion chamber 272 is a horizontally positioned, cylindrical-shaped container connected to primary chamber 274 by heat exchanger 250 through rectangular opening or passage 276 and is provided with an inlet member 278 connected to one end of the container and extending outwardly through the side wall of the heat exchanger and to the side wall of the housing. This pressure-type burner discharges into combustion chamber 272 in one end of the heat exchanger, and the hot fumes therefrom pass through substantially the full length of the heat exchanger, around the walls of passages 266 and 268, and thence upwardly through flue 254. The gun-type burner is of well known construction and hence will not be described in detail herein. The fuel oil is delivered from a tank, preferably disposed beneath the floor of the mobile home, through suitable connecting lines 280 to the burner. One of the advantages of the pressure gun-type burner is that it is more versatile and requires less care for satisfactory operation than pot-type burners.

The housing or shell consists of two insulated side walls 282 and 284, end walls 286 and 288, and top and bottom walls 290 and 292, each wall having inner and outer plates 294 and 296 and insulating material 298 between the plates. The combustion chamber is connected to the wall 300 at the end of the primary chamber of the heat exchanger and is supported in compartment 302 by a bracket 304. The heat exchanger is supported in spaced relation to the inner side of the housing by a plurality of brackets 306, and the housing is supported on the vehicle frame by suitable brackets, such as those shown at numerals 308 and 310.

While only two embodiments of the present invention have been disclosed herein, various changes and modifications can be made without departing from the scope of the present invention. For example, the burner disclosed may be replaced by suitable gas fixtures operating on either bottled gas or consumers' gas. The heat exchanger may be rectangular in transverse cross section and the hot and cold stacks may be placed directly above hole 104, eliminating horizontal flue 91. As used herein, the term "mobile home" refers to and includes any type of trailer or other vehicle of the general construction described herein.

I claim:

1. The combination of a mobile home having a frame of two longitudinally extending members and a plurality of spaced transverse members secured to the upper side of said longitudinal members, a floor and two side and end walls supported by said transverse members, a roof and ceiling supported by said walls, and panels forming a compartment of limited area extending from said floor to said ceiling adjacent one of said side walls and having a vent near the top thereof, and a heating system including an insulated housing of elongated rectangular shape horizontally disposed directly between said longitudinal frame members and two of said transverse members and positioned in close proximity to the undersurface of said floor, support means connecting said housing to said transverse members, a blower connected to said housing and discharging thereinto, said blower being disposed along one side of said housing and spaced downwardly from the upper edge thereof the height of said transverse members, a heat exchanger in said housing, a flue connected to one end of said heat exchanger and passing upwardly through said floor within the confines of said longitudinal and the respective transverse members and extending through the compartment, ceiling and roof, a stack completely surrounding and enclosing said flue from said housing to and through said ceiling and roof and having a vent near the top thereof communicating with said first mentioned vent, a conduit connecting the lower portion of said stack with said blower on the intake side thereof, a burner of the pressure gun-type disposed at the other end of said housing and discharging into said heat exchanger, and conduits connecting said housing with the living space in the home at remote points therein.

2. The combination of a mobile home having a frame of two longitudinally extending members and a plurality of spaced transverse members secured to the upper side of said longitudinal members, a floor and two side and end walls supported by said transverse members, a roof joined to said walls, and panels forming a compartment of limited area extending from said floor to said ceiling adjacent one of said side walls and having a vent near the top thereof, and a heating system including an insulated housing of elongated rectangular shape horizontally disposed directly between said longitudinal frame members and two of said transverse members and positioned in close proximity to the undersurface of said floor, a blower connected to said housing and discharging thereinto, said blower being disposed along one side of said housing and spaced downwardly from the upper edge thereof the height of said transverse members, a heat exchanger in said housing, a flue connected to one end of said heat exchanger and passing upwardly through said floor within the confines of said longitudinal and the respective transverse members and extending through the compartment and roof, a stack completely surrounding said flue from said housing to and through said roof and having a vent near the top thereof communicating with said first mentioned vent, a conduit connecting the lower portion of said stack with said blower on the intake side thereof, a burner disposed at the other end of said housing and discharging into said heat exchanger, and conduits connecting said housing with the living space in the home.

3. The combination of a mobile home having a frame of two longitudinally extending members and a plurality of spaced transverse members secured to the upper side of said longitudinal members, a floor and two side and end walls supported by said transverse members, a roof joined to said walls, panels forming a compartment of limited area extending from said floor to said ceiling adjacent one of said side walls and having a vent near the top thereof, and a heating system including an insulated housing of elongated rectangular shape horizontally disposed directly between said longitudinal frame members and two of said transverse members and positioned in close proximity to the undersurface of said floor, support means connecting said housing to said transverse members, a heat exchanger in said housing, a flue connected to one end of said heat exchanger and passing upwardly through said floor within the confines of said longitudinal and the respective transverse members and extending through the compartment and roof, a stack completely surrounding said flue from said housing to said roof and having a vent near the top thereof communicating with said first mentioned vent, a conduit connecting the lower portion of said stack with said blower on the intake side thereof, a blower disposed along the side of said housing and beneath one of said transverse members, and a burner discharging into said heat exchanger.

4. A combination of a mobile home having a frame of two longitudinally extending members and a plurality of spaced transverse members secured to the upper side of said longitudinal members, a floor and two side and end walls supported by said transverse members, and a roof joined to said walls, and a heating system including an insulated housing of elongated rectangular shape horizontally disposed directly between said longitudinal frame members and two of said transverse members and positioned in close proximity to the undersurface of said floor, a heat exchanger in said housing, a flue connected to one end of said heat exchanger and passing upwardly through said floor within the confines of said longitudinal and the respective transverse members and extending through the roof, a stack completely surrounding and enclosing said flue from said housing to said roof, a blower disposed along the side of said housing and beneath one of said transverse members, and a burner discharging into said heat exchanger.

5. The combination of a mobile home having a frame of two longitudinally extending members and a plurality of spaced transverse members secured to the upper side of said longitudinal members, a floor and two side and end walls supported by said transverse members, and a roof joined to said walls, and a heating system including an insulated housing of elongated rectangular shape horizontally disposed directly between said longitudinal frame members and two of said transverse members and positioned in close proximity to the undersurface of said floor, a heat exchanger in said housing, a flue connected to said heat exchanger and passing upwardly through said floor within the confines of said longitudinal and the respective transverse members and extending through the roof, a stack completely surrounding said flue from said housing to said roof, a blower disposed along the side of said housing and beneath one of said transverse members, and a burner discharging into said heat exchanger.

6. The combination as defined in claim 5 in which said burner is a pressure gun-type burner.

7. The combination as defined in claim 5 in which said burner is a pot-type burner.

8. The combination of a mobile home having a frame of two longitudinally extending members, transverse members on said longitudinal members, a floor and two side and end walls supported by said transverse members, a roof joined to said walls, panels forming a compartment of limited area extending from said floor to said ceiling adjacent one of said side walls and having a vent near the top thereof, and a heating system including an insulated housing horizontally positioned in close proximity to the undersurface of said floor between said longitudinal members, a heat exchanger in the housing, a flue connected to said heat exchanger and passing upwardly through said floor, within the confines of said longitudinal and the respective transverse members and extending through the compartment and roof, a stack completely surrounding and enclosing said flue from said housing to said roof and having a vent near the top thereof communicating with said compartment, a conduit connecting the lower portion of said stack with said housing, a blower disposed along the side of said housing and beneath one of said transverse members, and a burner discharging into said heat exchanger.

9. The combination of a mobile home having a frame of two longitudinally extending members, transverse members on said longitudinal members, a floor and two side and end walls supported by said members, a roof joined to said walls, and a heating system having an insulated shell of rectangular shape horizontally disposed between said members and positioned in close proximity to the undersurface of said floor between said longitudinal members, a heat exchanger in the housing, a flue connected to said heat exchanger and passing upwardly through said floor within the confines of said longitudinal and the respective transverse members and extending through the roof, a stack completely surrounding said flue from said shell to said roof, a conduit connecting the lower portion of said stack with said shell, a blower disposed along the side of said housing and beneath one of said transverse members, and a burner discharging into said heat exchanger.

References Cited by the Examiner

UNITED STATES PATENTS

| | | | |
|---|---|---|---|
| 309,279 | 12/1884 | Zimmerman | 237—31 |
| 1,328,820 | 1/1920 | Clark | 237—32 |
| 2,376,172 | 5/1945 | Mueller | 126—116 |
| 2,408,691 | 10/1946 | Shaw | 126—116 X |
| 2,475,737 | 7/1949 | Campbell | 126—116 |
| 2,493,425 | 1/1950 | Sweeley et al. | 237—31 |
| 2,523,569 | 9/1950 | Harvey | 237—31 |
| 2,669,393 | 2/1954 | Schleicher | 237—55 X |
| 2,765,726 | 10/1956 | Powers | 98—33 X |
| 2,804,869 | 9/1957 | Besser | 126—110 |
| 2,811,095 | 10/1957 | Moran | 126—307 X |
| 2,893,066 | 7/1959 | Perdue | 20—2 |

EDWARD J. MICHAEL, *Primary Examiner.*

JAMES W. WESTHAVER, FREDERICK L. MATTESON, JR., *Examiners.*

V. M. PERUZZI, M. L. BATES, *Assistant Examiner.*